Oct. 4, 1960 R. W. HUGHES 2,955,280

DATA PROCESSING TRANSPOSITION SYSTEM

Filed Aug. 29, 1956

INVENTOR
ROBERT W. HUGHES
BY Percy P. Lantzy
ATTORNEY

United States Patent Office
2,955,280
Patented Oct. 4, 1960

2,955,280

DATA PROCESSING TRANSPOSITION SYSTEM

Robert W. Hughes, Mountain Lakes, N.J., assignor to International Telephone and Telegraph Corporation, Nutley, N.J., a corporation of Maryland Filed Aug. 29, 1956, Ser. No. 606,872

8 Claims. (Cl. 340—172.5)

This invention relates generally to data processing and in particular to a device for transposing groups of recorded "words" having blank spaces between them into groups of magnetically recorded words without these blank spaces.

Magnetic recording has been widely used in many fields particularly in the data processing or computer fields. In using magnetic recording means in data processing practice, it is often necessary to select certain information from, for instance, a punched card while all other information on the card or source is not necessary for the particular operation. For example, a card which represented a salesman's performance for a period of time might include many items to wit, his territory, customer number, amount of particular produce sold et al. The report emanating from the data processing machine however at a particular time may be only concerned with the amount of a particular product that this salesman has sold. Similarly, the amount of this product sold by all the other salesmen of the company would be of interest. In this hypothetical situation, the magnetic recording means would scan all of the cards representing the salesmen's activities and extract this information from each. In the usual practice of this scanning there results a magnetic recording which has bits of information followed by an interval of space where the other information on the card could have been recorded and a next bit of information representing the significant data on the next card scanned and so on. Having extracted the informatioin, it very often becomes necessary to scan the tape numerous times for combination reports. The repeated scanning of a tape having blank spaces along with the rewinding of this unnecessarily long tape results in an uneconomical use of time when viewed from the data extracted per length of tape, and hence there have been methods developed to condense the information into a smaller tape.

Among the various methods is the use of computer storage facilities where the information from the original run is stored and eventually extracted to be recorded. This method has two disadvantages, namely, the storage capacity of a computer is usually limited and storage facilities in a normal computer operation are at a premium so that to use them for transposing recorded information might result in a time economic loss rather than a gain. Another method of condensing the data is to record on a multiple track record. This method shortens the length of tape, resulting in an advantage for rewinding but does not provide for the elimination of the blank space intervals.

It is an object of this invention to provide an improved system for transposing and recording groups of data "words" so as to eliminate blank spaces between the words.

A second object of this invention is to provide a recording system which will enable the length of the record to be reduced without interfering with the normal use of the data storage means.

In a preferred embodiment for carrying out my invention a commutator is coupled to a plurality of delay lines, whose values of delay time represent a continuum from "no delay" to a delay of "N-bit width" time. There is provided a delay line and a commutator segment for each possible information bit of a recorded or data word. The characteristics of the delay unit are determined by the relation of the space of the original record occupied by the word to the space of the original record occupied by the blank between the words. The record upon which the data is being recorded moves at a rate of speed which is a fraction of the rate of speed of the data input and this fraction is also determined by the ratio of the word space to the blank space. The data input is sensed and converted into electrical pulses or other signal forms and passed through the commutator and through the delay lines to a common output. At the common output the electrical signals are passed to a recorder head where the signals are transferred to a record. The provision for delaying the signals or portions thereof in an increasing gradient form in conjunction with the predetermined ratio of speeds of the data input reader to the data recorder, enables the reader to pass over the blank spaces while previously detected signals are concurrently being recorded at the recorder head, and at the termination of the recording the reader starts detecting the next signals. Since the information to be transferred will follow a specific pattern in the original form, for instance, having all the information being extracted from the same physical position on a punched card, then the ratio of the speed of the data reader to that of the speed of a data recorder can be constant. The end product is a data recording without the blank spaces and whose recorded words are in exact copy of the original information.

The above mentioned and other features and objects of this invention will become more apparent by reference to the following description taken in conjunction with the accompanying drawings in which.

Figures 1, 2:
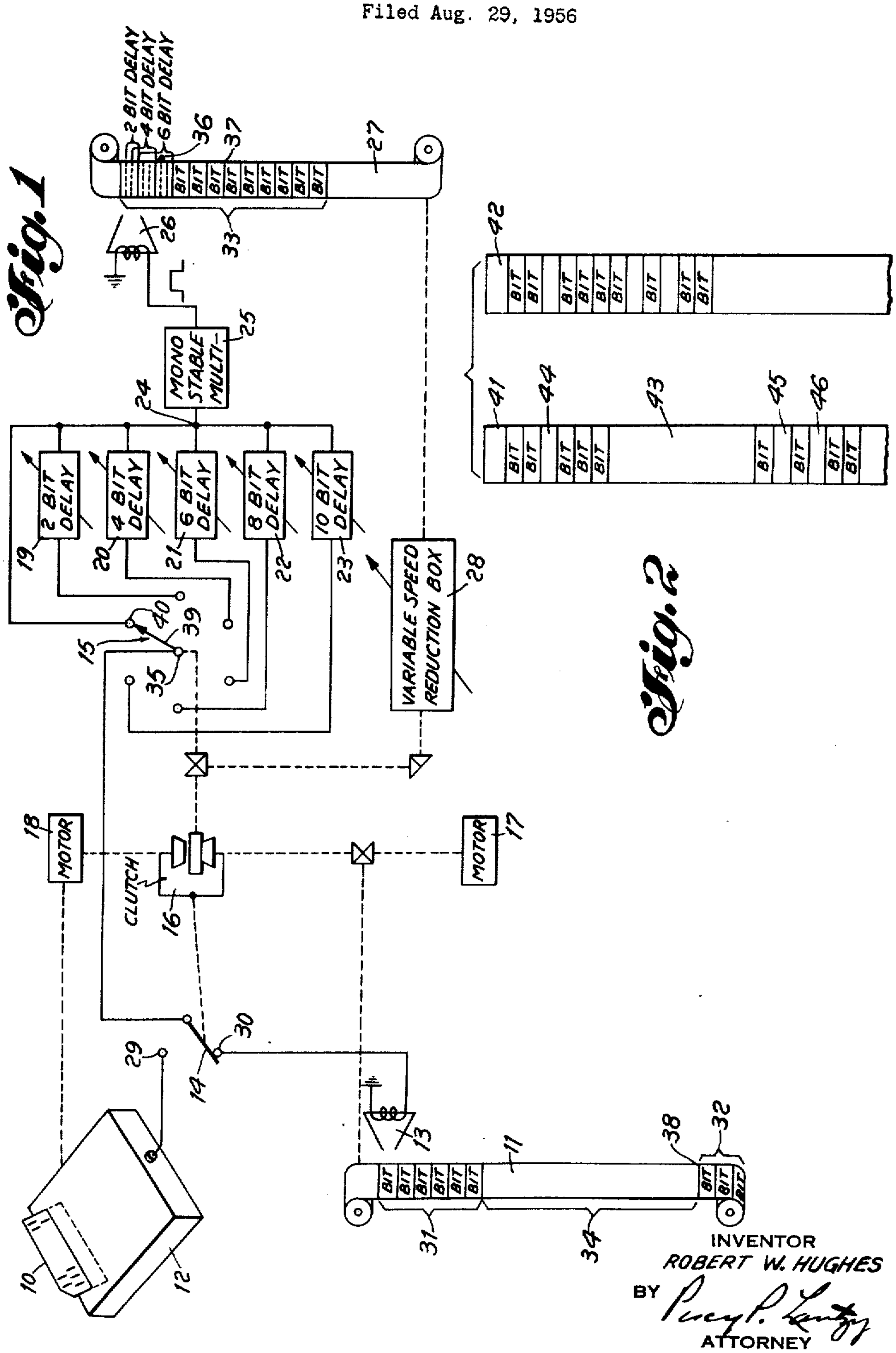
Fig. 1 is a schematic and block diagram showing the system as a whole with two sources of original information.
Fig. 2 is a diagram of two tapes showing the resultant tape with the transposed information.

In Fig. 1 there is recorded data in the form of a punched card at 10 or recorded data in the form of a magnetic tape at 11. At 12 there is a recorded data reader such as a set of brushes for reading the holes in the card while at 13 there is a magnetic reading head. Both readers 12 and 13 are connected to the points of switch 14. The common point of switch 14 is connected to the common of commutator 15. Commutator 15 is driven through clutch 16 by either motor 17 or 18. The clutch 16 enables the commutator to be illustrated as being either coupled to a motor 17 as it would be in a separate device for transposing information from one tape to another or coupled to motor 18 which might represent the motor of a punched card feed-in device. As is illustrated, motors 17 and 18, respectively, drive the tape spools and the punched card feed-in device thus insuring that the commutator drives at the same rate as the readers. Each of the segments of the commutator except the first segment is connected to one of the delay lines at 19, 20, 21, 22 and 23. The delay lines are connected to a common point 24 which depending on the signal form may or may not be coupled through a monostable multivibrator 25 to the recorder head 26. The recording tape 27 is driven from the variable speed reduction box 28 which is in turn driven from the commutator disk of clutch 16. The operation of the invention becomes more comprehensive with the following description.

In Fig. 1 recorded data either in a punched card form as shown at 10 or in a magnetic recorded form as shown at 11 is passed through the respective reading devices at 12 and 13. Depending on whether switch 14 is connected to points 29 or 30, the recorded data will be read from the card or the tape. For illustrative purposes let us assume that the object of the transposition is to transfer magnetically recorded "words" of six bits as shown at 31 and 32 over to tape 27 and into a form as shown at 33, that is without the blank spaces which occur on the tape 11 at 34. As the information bits are read at the reader head 13 they are transferred through points 30 of switch 14 to the commutator common 35 of commutator 15. As the commutator passes each segment, the pulse or other signals will be carried to its respective delay line. For instance, if the third bit were being read at the reader 13 the commutator would direct the pulse to the four bit delay line. This delay line delays the pulse until point 36 of tape 27 is under the recording head. Before we consider the pulse travel further, we must examine the relation of the tape speeds. The space interval 34 is twice as long as the word interval 31 which means that the ratio of the total length of tape used to the word length is 3 to 1. In order to have the same pattern on tape 27 as on tape 11 but eliminate the space interruption at 34, the tape 27 must run at one third the speed of tape 11. If this ratio of speeds is provided for, then point 37 arrives under the recorder head 26 at the same time that point 38 arrives under the reading head 13 and concurrently the commutator arm 39 is at segment 40.

Returning now to the pulse which had been directed to the four bit delay line we find that this pulse is delayed four bits of tape 27 or as illustrated, so that the tape 27 can move until the point 36 is under the recorder head 26. If the signals are in a pulse form, the monostable multivibrator is part of the circuit and gives the proper shape to the pulse which is necessary for the correct functioning of the recorder head 26.

The delay lines at 19 through 23 are shown as variable since the amount of the delay is dependent on the ratio of the speeds between the two tapes. The formula given to determine these delays is $D=(N-1)(R-1)$ where D is the delay in multiples of bit width, N equals the *n*th bit of the recorded word and R equals the ratio of the word length to the total length. It becomes clear that the determining factor in deciding the setting of the variable components is the ratio of the word length to the total length. Once the aforementioned ratio is established the variable components are set and the device transposes space interrupted data information to the magnetic recorded non-interrupted formation.

In Fig. 2 the tape at 41 is an original tape and shows two recorded words each with space interruptions within the words. It is not the purpose of this invention to eliminate the space interruptions necessary to the intelligence of the word and as can be seen at tape 42 the words have been condensed to eliminate the spaces shown at 43 but retain the spaces at 44, 45 and 46.

While I have described above the principles of my invention in connection with specific apparatus, it is to be clearly understood that this description is made only by way of example and not as a limitation to the scope of my invention, as set forth in the objects thereof and in the accompanying claims.

I claim:

1. A system for recording data, having regularly recurrent blank spaces therein, into a substantially non-interrupted pattern comprising a source of said data, means including a data input device associated with said source for converting said data into electrical signals, an electrical signal delay means for delaying successive portions of said signals by successively greater amounts, means for commutating the successive delays, a recording means, means for driving said recorder means at a rate of speed which is a fraction of said data input device, and circuitry means to couple said recording means through said delay means to the output of said converting means whereby the electrical signal time delay gradient causes the signals to be recorded in a substantially non-interrupted pattern.

2. A reading and recording system for transposing recorded data having a regularly recurrent blank space interrupted pattern to recorded data having a substantially non-interrupted pattern comprising a recorded data reader for converting said data into electrical signals, a commutator, a plurality of electrical delay lines for delaying successive signals by successively greater delays dependent on the number of bits of a recorded word, said plurality of delay lines coupled through said commutator to said recorded data reader, a data recorder coupled to the output of said plurality of electrical delay lines, a driving means for driving said commutator and said data reader at a first speed while driving said data recorder at a second speed slower than said first speed in order that recorded data information appearing in a pattern including regularly recurrent space intervals at said recorded data reader might appear at said data recorder without said blank spaces.

3. A reading and recording system as recited in claim 2, wherein said data recorder comprises a magnetic recorder means.

4. A magnetic reading and recording system for rearranging magnetically recorded data from a regularly recurrent blank space interrupted pattern to a substantially non-interrupted pattern comprising a magnetic record reader to convert said data into electrical signals, a commutator, a plurality of electrical delay lines for delaying successive signals by successively greater delays dependent on the number of bits of a recorded word, said plurality of electrical delay lines coupled through said commutator to said magnetic record reader, a magnetic recorder, means to couple said magnetic recorder to the output of said plurality of electrical delay lines, a first and second driving means for driving said reader and said recorder respectively, said first driving means coupled to said commutator for driving said commutator at the same speed as said reader, said second driving means driving said recorder at a rate different from said reader such that magnetically recorded information data appearing in a pattern including regularly recurrent blank space intervals at said magnetic record reader appears at said magnetic recorder without said blank space intervals.

5. A magnetic reading and recording device as recited in claim 4, wherein said signals are in the form of pulses and wherein said means for coupling said magnetic recorder to said electrical delay lines includes a monostable multivibrator for shaping said pulses.

6. A magnetic reading and recording device as recited in claim 4, wherein the delay characteristics of each delay line are determined by the formula $$D=(N-1)(R-1)$$

where N equals the *n*th bit of the magnetically recorded word and R equals the ratio of the word length to the total length and D is the required delay in multiples of the bit width.

7. A magnetic reading and recording device as recited in claim 4, wherein said magnetic record reader and said magnetic recorder head respectively comprise a magnetic tape reader head and a magnetic tape recorder head.

8. A magnetic reading and recording device for rearranging magnetically recorded words from a regularly recurrent interrupted pattern to a non-interrupted pattern comprising a magnetic record reader to translate magnetic pulses to electrical pulses, a commutator which has as many output segments as there are possible magnetic bits in each of said magnetic recorded words, a plurality of electrical delay lines having successive delay intervals dependent on the number of bits in the recorded word each one associated with an output segment of said commutator and connected to said magnetic record reader through said commutator, a monostable multivibrator, a magnetic recorder coupled to a common output of said plurality of electrical delay lines through said monostable multivibrator, a first and second driving means for driving said reader and said recorder respectively, said first driving means coupled to said commutator for driving said commutator at the same speed as said reader, said second driving means driving said recorder at a rate different from said reader such that magnetically recorded information words appearing in a pattern including regularly recurrent blank space intervals at said magnetic recorder reader appears at said magnetic recorder without said blank space intervals.

References Cited in the file of this patent

UNITED STATES PATENTS

| | | |
|---|---|---|
| 2,635,229 | Gloess | Apr. 14, 1953 |
| 2,737,646 | Muffly | Mar. 6, 1956 |
| 2,779,933 | Bradburd | Jan. 29, 1957 |
| 2,853,698 | Nettleton | Sept. 23, 1958 |